(12) United States Patent
Bellet et al.

(10) Patent No.: US 7,288,690 B2
(45) Date of Patent: Oct. 30, 2007

(54) METHOD AND APPARATUS FOR STEAM CRACKING HYDROCARBONS

(75) Inventors: Serge Bellet, Chateauneuf-les-Martigues (FR); Jean Pinon, Aix-en-Provence (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 11/254,561

(22) Filed: Oct. 20, 2005

(65) Prior Publication Data

US 2006/0116543 A1 Jun. 1, 2006

Related U.S. Application Data

(63) Continuation of application No. 10/009,939, filed as application No. PCT/FR00/01852 on Jun. 30, 2000, now abandoned.

(30) Foreign Application Priority Data

Jul. 7, 1999 (FR) .................................. 99 09039

(51) Int. Cl.
*C07C 4/02* (2006.01)
*F28D 7/00* (2006.01)

(52) U.S. Cl. ...................... 585/648; 585/649; 585/650; 208/106; 208/113; 208/130; 422/199

(58) Field of Classification Search ................ 422/199; 585/648, 649, 650; 208/106, 129, 130, 113
See application file for complete search history.

(56) References Cited

U.S. PATENT DOCUMENTS 3,765,167 A * 10/1973 Rudolph et al. .............. 60/774

| | | | |
|---|---|---|---|
| 3,819,740 A | | 6/1974 | Hori |
| 3,862,898 A | * | 1/1975 | Boyd et al. .................. 208/73 |
| 4,287,377 A | | 9/1981 | Maslin et al. |
| 4,479,355 A | | 10/1984 | Guide et al. |
| 4,762,958 A | | 8/1988 | Martens et al. |
| 4,777,318 A | | 10/1988 | Martens et al. |
| 4,912,282 A | * | 3/1990 | Klaus ......................... 585/648 |
| 6,734,331 B2 | * | 5/2004 | Cirrito et al. ................ 585/652 |

(Continued)

FOREIGN PATENT DOCUMENTS

EP 0 733 609 9/1966

(Continued)

OTHER PUBLICATIONS

Patent Abstracts of Japan of JP 9-235564 dated Sep. 9, 1997.

*Primary Examiner*—N. Bhat
(74) *Attorney, Agent, or Firm*—Ladas & Parry LLP

(57) ABSTRACT

A method and apparatus for steam cracking hydrocarbons, which method consists in heating a mixture of hydrocarbons and steam to a desired temperature that is high enough to crack the hydrocarbons and transform them into olefins, the source of energy needed for heating the mixture is supplied essentially by cogeneration using combustion of a fuel to produce simultaneously both heat energy and mechanical work which is transformed into electricity by an alternator, and wherein the mixture is initially subjected to preheating using the heat energy supplied by the cogeneration and is subsequently heated to the desired cracking temperature by means of electrical heating using the electricity supplied by the cogeneration.

22 Claims, 1 Drawing Sheet

U.S. PATENT DOCUMENTS 6,958,363 B2 * 10/2005 Espinoza et al. ........... 518/709

FOREIGN PATENT DOCUMENTS

| EP | 0 252 355 | 1/1988 |
|---|---|---|
| EP | 0 252 356 | 1/1988 |
| EP | 0 806 467 | 11/1997 |
| JP | 9-235564 | 9/1997 |
| WO | 92-11931 | 7/1992 |

* cited by examiner

METHOD AND APPARATUS FOR STEAM CRACKING HYDROCARBONS

This is a continuation of application Ser. No. 10/009,939 filed on Feb. 28, 2002 (now abandoned) which is a 371 of International Application PCT/FR00/01852 filed on Jun. 30, 2000, which designated the U.S., claims the benefit thereof and incorporates the same by reference.

The present invention relates to a method of steam cracking hydrocarbons in order to produce olefins, in particular.

A known steam cracking method consists in causing a mixture of hydrocarbons and steam to pass along at least one cracking tube such as a coil placed in a furnace. On being raised to high temperature, e.g. in the range 700° C. to 900° C., the hydrocarbons are cracked so as to provide olefins in particular and possibly also diolefins and light alkanes such as methane. It will readily be understood that it is not possible to raise the hydrocarbons for cracking instantly to the desired reaction temperature, and that this temperature varies progressively along the cracking tube in application of a profile that is more or less steep, in particular when passing through preheating zones.

As a general rule, a steam cracking furnace uses radiant heat delivered by burners such as conventional gas or oil burners as its source of heat. The burners are often placed on the floor and/or the walls of the furnace and they define a high temperature zone in the furnace, also referred to as the "radiation" zone of the furnace. Immediately above said zone, there is a convection zone through which the hot combustion gases escape from the radiation zone, which convection zone is generally used for preheating the mixture of hydrocarbons to be cracked, also known as the "feedstock" to be cracked. Thus, the mixture is usually preheated to about 500° C. in the convection zone of a furnace, after which it enters the radiation zone of the furnace where it reaches the reaction temperature, in particular a temperature in the range 700° C. to 900° C.

Such a method thus consists in performing an entire heat treatment program from the preheating stage to the cracking stage proper within a single heating furnace, using the radiant heat from the burners as the source of heat. The furnace must be capable of withstanding the highest temperatures involved in the method, and it must also be a piece of equipment that is large in size, with all of the manifest drawbacks associated with size.

The method of steam cracking also requires accurate control over heating in the reaction zone, i.e. the high temperature zone. With furnaces that use the radiant heat delivered by burners as the source of heat, and insofar as all of the inside space of the furnace is heated by said radiant heat, temperature can only be controlled indirectly, and thus inaccurately.

U.S. Pat. No. 4,912,282 describes a method and apparatus for steam cracking hydrocarbons to produce olefins such as ethylene. The apparatus comprises a cracking furnace that is heated by burning fuel using an oxidizer comprising a mixture of air and exhaust gas from a gas turbine that forms part of a cogenerator system. The gas turbine is coupled to an electricity generator which feeds electricity to compressors and pumps. The combustion air as preheated in that method enables the combustion temperature to be increased and thus enables the efficiency of the radiation zone (high temperature zone) of the cracking furnace to be increased, and consequently enables fuel consumption to be reduced. Nevertheless, temperature control in the radiation zone of the cracking furnace remains inaccurate, and the size of the furnace is very large. Furthermore, a high level of harm continues to be done to the environment by nitrogen oxide being rejected to the atmosphere together with the combustion gases from the cracking furnace.

European patent application No. EP 0 806 467 describes a method of pyrolyzing hydrocarbons which is performed together with a continuous decoking method specifically for the purpose of reducing or eliminating the losses of time usually associated with stops for decoking. The pyrolysis method includes a prior step of steam cracking in a steam cracking furnace followed by the pyrolysis step proper which is performed in a pyrolysis reactor at very high temperature and which is intended to produce acetylene hydrocarbons such as acetylene. It is specified that the steam cracking furnace is normally heated by conventional gas burners, e.g. of the radiant burner type, and that the pyrolysis reactor can be heated either by electrical resistances or by jackets containing gas burners. There is no description nor suggestion of the electrical resistances being powered electrically by a cogenerator system. Furthermore, it is mentioned that electrical heating is not at all to be recommended for such a reactor because of high investment and running costs.

Japanese patent application JP 09 235 564 proposes a method of thermally cracking hydrocarbons to produce ethylene. In that method, the feedstock is preheated by means of the combustion heat from a preheating furnace provided with conventional burners, and is then subjected to thermal cracking in a high temperature zone by means of induction heating. Nevertheless, the electricity required for the induction heating does not come from a cogenerator system. Furthermore, the preheating furnace is provided with conventional burners with all of the above-mentioned drawbacks for that type of heating associated in particular with environmental problems such as rejecting nitrogen oxides to the atmosphere together with the combustion gases of such a furnace.

The present invention relates to a method of steam cracking hydrocarbons that makes it possible to avoid or reduce very significantly the drawbacks mentioned above. In particular, the invention provides a method of steam cracking hydrocarbons, which method consists in heating a mixture of hydrocarbons and steam to a desired temperature that is high enough to crack the hydrocarbons and transform them into olefins, the method being characterized in that the source of energy needed for heating the mixture is supplied essentially by cogeneration using combustion of a fuel to produce simultaneously both heat energy and mechanical work which is transformed into electricity by an alternator or an electricity generator, and in that the mixture is initially subjected to preheating using the heat energy supplied by the cogeneration, and is subsequently heated to the desired cracking temperature by means of electrical heating using the electricity supplied by the cogeneration.

Figure 1:
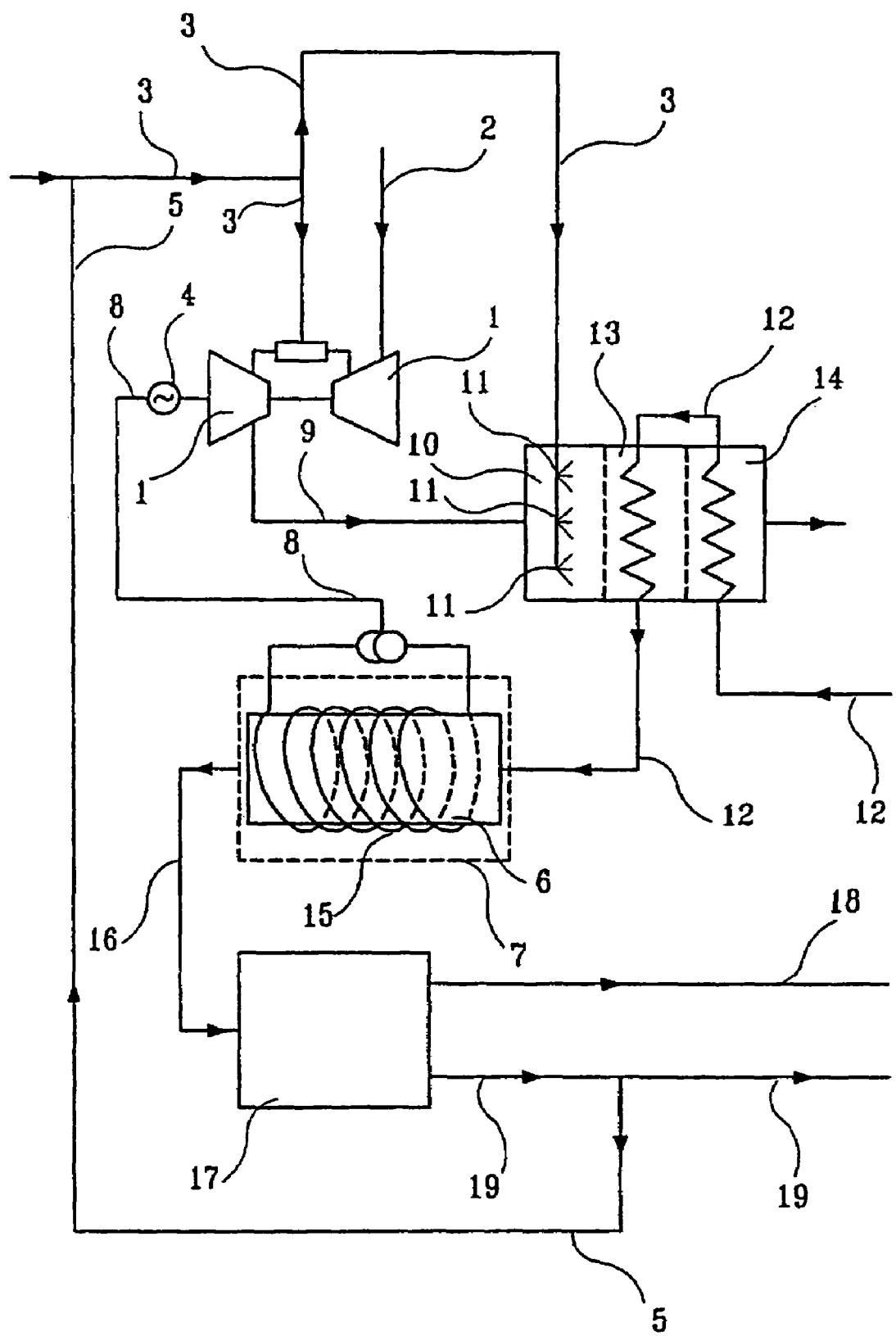
FIG. 1 is a diagram of apparatus for implementing the method of the present invention.

The steam cracking method of the present invention is particularly advantageous when the cogeneration uses fuel selected from at least one of the cracked hydrocarbons (i.e. as obtained by the cracking), in particular one or more gaseous alkanes e.g. in the range $C_1$ to $C_4$, and preferably methane. Under such circumstances, the fuel is preferably a gaseous hydrocarbon fuel.

Using a preferably gaseous fuel for combustion purposes enables cogeneration to produce simultaneously both heat and mechanical work. The mechanical work as produced by a heat engine or a gas engine, for example, or preferably by a gas turbine, is generally used to drive at least one alternator that produces electricity. By recovering the heat energy that is normally lost when producing mechanical work, cogeneration thus provides both heat and mechanical work which can be reused in appropriate and advantageous manner.

The cogeneration implemented in the present invention advantageously gives self-contained control and management over the production of electricity adapted to the specific requirements of the electrical heating, e.g. by selecting the power and/or the frequency of the electricity to be suitable for achieving the desired high temperatures for cracking. Furthermore, cogeneration, which preferably uses a gaseous fuel such as natural gas or preferably one or more of the hydrocarbons produced by the cracking, e.g. alkanes in the range $C_1$ to $C_4$ and in particular methane, has the advantage of providing not only significant energy savings, but also a solution to concerns related to combating atmospherical pollution, in particular by minimizing the amount of nitrogen oxides that are rejected into the atmosphere together with the combustion gases.

The method of the present invention presents enormous potential associated with accurate control over the temperature profile in the electrical heating zone where the hydrocarbons are cracked. It provides greater flexibility in selection of the temperature profile, thus making it possible to optimize the cracking of hydrocarbons.

The method of the present invention advantageously presents implementation that is much simpler than that required for previously known steam cracking methods. It also has the enormous advantage of being economically viable.

Cogeneration in particular by means of a gas turbine generally comprises: a) compressing fresh air or oxidizer (containing oxygen) to an absolute pressure of 1.5 megapascals (MPa) to 2.5 MPa, for example, depending on the desired electrical power; then b) introducing the air or oxidizer as compressed in this way and as mixed with the preferably gaseous fuel into a combustion chamber to perform combustion; then c) after combustion, expanding the hot combustion gases in a turbine that is generally coupled to at least one generator or alternator producing electricity; and d) recovering the hot combustion gases as a source of heat. A portion of the mechanical work that is produced can be used for the initial compression of air or oxidizer, e.g. by driving an air turbocompressor.

In the method of the present invention, the temperature of the hot combustion gases delivered by the cogeneration (after expansion) can lie in the range 400° C. to 570° C., and preferably in the range 470° C. to 550° C. This heat energy is preferably used directly to preheat the mixture for cracking. Thus, the hot combustion gases exchange their heat with the mixture for cracking which can flow as a countercurrent to said hot gases, for example, passing through one or more preheating zones so as to be heated up to a temperature of about 500° C., for example.

The hot combustion gases leaving the cogeneration can be relatively rich in oxygen, for example they can contain 10% to 18% and preferably 12% to 17% by volume of oxygen. It is possible to use part of this oxygen as an oxidizer, thereby performing post-combustion and increasing the heat energy used for preheating the mixture that is to be cracked. In practice, post-combustion can be performed directly at the outlet of the cogeneration prior to preheating the mixture for cracking. Under such circumstances, the hot combustion gases leaving cogeneration are introduced into a post-combustion chamber, and a fuel, which can be different from but is preferably identical to that used for the cogeneration, is added thereto so as to come into contact with the hot gases. The fuel used in the post-combustion is preferably one or more hydrocarbons produced by the cracking, for example alkanes in the range $C_1$ to $C_4$, and in particular methane. Merely on coming into contact with the hot gases from the cogeneration, the added fuel burns in the post-combustion chamber. Thus, post-combustion delivers exhaust gases that are extremely hot and that produce the desired increase in heat energy.

The temperature reached by the post-combustion exhaust gases can lie in the range 500° C. to 1100° C., and preferably in the range 550° C. to 800° C., e.g. 700° C. These gases can then be used directly to preheat the mixture for cracking. Under such circumstances, they exchange heat with the mixture for cracking which flows as a countercurrent to said exhaust gases, for example, by passing in succession through one or more preheating and superheating zones. It is also possible, optionally, to exchange the heat of these exhaust gases simultaneously with water or steam in one or more boilers so as to produce the hot water or the steam at low or medium pressure (e.g. 0.1 MPa to 12 MPa) and increase the energy efficiency of the method. The steam produced in this way can be used in situ as a source of energy in the steam cracking method and in particular during the steps of separating, fractioning, and purifying the olefins and light alkanes that are produced.

During post-combustion, part of the oxygen contained in the hot gases from the cogeneration is consumed so that the oxygen content of the post-combustion exhaust gas can lie in the range 1% to 10% and preferably in the range 1% to 5%, by volume. The temperature of the post-combustion exhaust gas after heat exchange with the mixture for cracking is substantially decreased and can lie in the range 120° C. to 300° C., and preferably in the range 150° C. to 250° C.

The mixture of hydrocarbons and of steam can thus be preheated by passing through one or more preheating and possibly superheating zones, essentially by convection in heat exchangers exchanging heat with the combustion of gas from the cogeneration or preferably the exhaust gas from post-combustion as described above. The temperature of the mixture after preheating can reach 400° C. to 600° C., and preferably lies in the range 450° C. to 550° C.

By way of example, it is possible to use a cogenerator system constituted by a "Frame 9"® type gas turbine from General Electric capable of delivering 120 megawatts (MW) of electrical power. The heat power which can be produced downstream from that system is 130 MW, and it can be raised up to 150 MW if post-combustion of the kind described above is implemented. Under such circumstances, the cogenerator system has the energy capacity to run steam cracking furnaces with a total capacity of 300,000 (metric) tonnes per annum of ethylene.

The preheated mixture is then heated to the cracking temperature by means of electrical heating powered with the electricity produced by the cogeneration. One of the advantages of the present invention is to be able to adapt at will the amount of electricity provided on site by the cogeneration, and in particular to adapt the electrical power and/or frequency to the specific requirements of the electrical heating, and thus reach the desired cracking temperature throughout the cracking tube(s), in particular in application of a determined temperature-increase profile up to the desired maximum cracking temperature.

The electrical heating techniques used for reaching the desired cracking temperature can be induction heating or Joule effect heating, e.g. by means of a resistance element tube.

With induction heating, the mixture for cracking can be heated in a heating furnace by induction. The furnace can comprise a plurality of induction heater tubes that are connected together in parallel. The preheated mixture of hydrocarbons and steam flows inside the tubes where it is subjected to thermal cracking suitable for forming olefins, and this is done in said high temperature range obtained by means of the induction furnace. The induction heating tubes can be inside an enclosure which is closed and leaktight. Each induction heating tube can comprise a tube (or "cracking" tube) carrying a flow of the preheated mixture of hydrocarbons and steam, together with an inductor coil wound around the tube. Lagging can be placed between the tube and the coil and further lagging can be placed over the coil as an outer covering. The coil can be constituted by a winding of copper wire. A generator or alternator, e.g. operating at high frequency, can be connected to the ends of the coil so as to power the coil electrically, e.g. at high frequency. The generator or alternator can be part of the cogeneration and can deliver exactly the amount of electricity required for induction heating. The generator or the alternator can also be connected to a frequency and power adapter delivering electricity suitable for induction heating of the tube(s) in which the steam cracking reaction is performed.

Induction heating is preferably performed at high frequency (HF), in particular at frequencies lying in the range 3 megahertz (MHz) to 30 MHz, e.g. frequencies of 13 MHz and 27 MHz. Induction heating is not limited to HF induction: it is also possible to use intermediate frequencies in the range 1 kilohertz (kHz) to 3 MHz, e.g. 2000 hertz (Hz), or a commercial induction frequency in the range 50 Hz to 100 Hz, e.g. 50 Hz or 60 Hz.

By way of example, it is possible to use induction heating and in particular the heating apparatus and HF heating tubes described in Japanese patent application JP 09 235 564.

When Joule effect heating is used, the mixture for cracking can be heated in one or more resistance element tubes, by applying electrical voltage between the ends of said tubes carrying the mixture. The heater device based on resistance element tubes comprises one or more tubes in which the mixture of hydrocarbons and steam flows, said tubes being made out of a conductive material, e.g. stainless steel, and said tubes being connected to a voltage generator. The tubes thus act to perform the following functions simultaneously: transport; electrical resistance elements; and heat exchanger surface. The electrical voltage applied to the resistance element tube(s) can be generated by a low voltage or very low voltage transformer powered by the generator or alternator forming part of the cogenerator system.

Heating by means of a resistance element tube is preferably implemented by using electricity at a voltage of less than 50 volts (V), thus ensuring safety for personnel. A power modulator can advantageously be used to control the temperature of the mixture of hydrocarbons and steam.

It is also possible to use a tube that vibrates when carrying electricity. Under such circumstances, the resistance element tube is subjected to transverse vibration, in particular at a frequency close to a resonant frequency of the tube. This has the advantage of reducing coke deposition on the inside wall of the resistance element tube, as described in European patent No. EP 0 519 050.

By way of example, it is possible to use resistance element tubes of the kinds sold by the following French companies: Etirex, Parmilleux, and Vulcanic.

It is also possible to use a resistance element tube associated with apparatus that enables induction heating to be performed simultaneously.

In a preferred embodiment of the present invention, ultrasound waves can be applied to the mixture of hydrocarbons and steam during cracking, as described in U.S. Pat. No. 3,819,740. It is possible to use an ultrasound wave generator powered using the electricity provided by the cogeneration. The frequency of the ultrasound waves supplied to the mixture for cracking in the electrical heater apparatus can lie in the range 1 kHz to 800 kHz, e.g. being 10 kHz or 20 kHz. It has been found that applying ultrasound waves during steam cracking of the hydrocarbon mixture serves to avoid or at least reduce internal coking of the cracking tubes and also serves to improve the selectivity of the steam cracking reaction.

The mixture of hydrocarbons and steam is subjected to a cracking temperature which can generally begin at an inlet temperature to the electrical heater apparatus lying in the range 400° C. to 700° C., preferably in the range 450° C. to 660° C., and which can generally end at a maximum or outlet temperature from said apparatus lying in the range 700° C. to 900° C., and preferably in the range 760° C. to 850° C. Between the inlet and the outlet of the electrical heater apparatus, the cracking temperature can increase along the cracking tubes in application of a profile that is continuous or discontinuous as described in European patents Nos. EP 0 252 355 and EP 0 252 356. The mean transit time of the mixture of hydrocarbons and steam between the inlet and the outlet of the electrical heating apparatus can lie in the range 300 milliseconds (ms) to 1800 ms. The reaction volume can be constant or varying all along the cracking tubes between the inlet and the outlet of the electrical heater apparatus, as described in the two above-cited European patents.

The present invention also provides hydrocarbon steam cracking apparatus comprising:

i) a cogenerator system comprising a gas turbine (1) connected to a line (2) for supplying it with air or oxidizer, to a line (3) for feeding it with fuel, and to at least one exhaust line (9) for exhausting hot combustion gases from the gas turbine (1), the turbine itself being coupled to at least one alternator or electricity generator (4) connected to at least one electrical line (8);

ii) at least one preheating chamber (14) for preheating a mixture of hydrocarbons and steam, the chamber being connected to at least one of the lines (9) for evacuating hot combustion gases and having at least one line (12) passing therethrough for transporting said mixture and enabling heat to be exchanged therewith;

iii) at least one electrical heater apparatus for heating at least one cracking tube (6) connected to at least one of the transport and heat exchange lines (12) leaving the chamber (14), and at least one drawing-off line (16) for drawing off cracked hydrocarbons, said electrical heater apparatus being connected to at least one of the electrical lines (8); and iv) at least one zone (17) for separating and purifying the cracked hydrocarbons, said zone being connected to at least one of the drawing-off lines (16).

In an aspect of the present invention, the electrical heater apparatus comprises at least one induction heating tube (6), e.g. having an induction coil (15) wound around said tube and connected to at least one of the electrical lines (8).

According to another aspect of the present invention, the electrical heating apparatus is a Joule effect heating apparatus, e.g. a resistance element tube comprising, for example, one or more tubes having their ends connected to at least one transformer which is in turn connected to at least one of the electrical lines (8). The resistance element tube heater device can be constituted in particular by one of those specified above.

In a preferred embodiment, the steam cracking device can also comprise at least one post-combustion chamber (10) placed on at least one of the lines (9) for evacuating the combustion gases from the gas turbine (1) and fed with a fuel feed line, preferably identical to the above-described line (3) for feeding the gas turbine, or branching therefrom. The fuel feed line can have one or more burners (11) at its end situated in the post-combustion chamber (10).

The post-combustion chamber (10) can be directly connected to at least one of the chambers (14) for preheating the mixture for cracking, such that the exhaust gases from the chamber (10) in particular can penetrate directly into at least one of the preheating chambers (14).

The post-combustion chamber (10) can also be indirectly connected to at least one of the preheating chambers (14) by being connected initially directly to at least one chamber (13) for superheating the mixture for cracking as already preheated in the chamber (14). Under such circumstances, the superheater chamber (13) has at least one of the transport and heat exchange lines (12) coming from one of the preheater chambers (14) passing therethrough, with said superheater chamber (13) preferably being directly connected to said preheater chamber. Thus, the exhaust gases from the post-combustion chamber (10) pass initially through at least one superheater chamber (13) and then through at least one preheater chamber (14) so that the gases can exchange their heat with the mixture for cracking flowing inside at least one of the transport and heat exchange lines (12).

In another preferred embodiment, the steam cracking apparatus comprising at least one separation and purification zone (17) for the hydrocarbons cracked in the tube (6) can include at least one line (19) for drawing off at least one of the cracked hydrocarbons, in particular a light hydrocarbon such as an alkane in the range $C_1$ to $C_4$, and in particular methane. At least one line (5) for recovering the cracked hydrocarbon(s) can run, for example as a branch connection, from the drawing-off line (19) and can be connected to at least one of the lines for feeding fuel to the gas turbine (1) and/or optionally a line for feeding fuel to at least one of the above-described post-combustion chambers (10).

When the electrical heating is induction heating, the alternator or electricity generator (4) can be connected to a frequency and power adapter delivering electricity suitable for induction heating the cracking tube (6) where the steam cracking reaction is performed. It is also possible to use a high frequency alternator, in particular at a frequency of the kind specified above for induction furnace heating.

When the electrical heating is performed by means of a resistance element tube, the alternator or electricity generator (4) can be connected to a low voltage or very low voltage transformer.

The steam cracking device can also comprise a network for recovering low or medium pressure steam (e.g. in the range 5 MPa to 10 MPa) by means of a water feed line passing through at least one of the preheater chambers (14) so as to preheat the water and create steam by heat exchange with the combustion gases passing through said chamber(s). This can also be done by recovering heat energy by heat exchange between the water previously preheated in this way and the cracked hydrocarbons leaving the electrical heater apparatus via the drawing-off line(s) (16). Thereafter the steam can be separated from the water and recovered in a steam line. The steam can then be heated and even superheated by heat exchange between the steam and the combustion gases passing through at least one of the preheater chambers (14) and preferably between the steam and the exhaust gas from at least one of the post-combustion chambers (10) passing through at least one of the superheater chambers (13). Under such circumstances, the steam line passes through at least one of the preheater and/or preferably superheater chambers (14, 13) so as to form steam at low or medium pressure.

By way of illustration, FIG. 1 is a diagram of apparatus that can be used to implement the method of the present invention.

The cogenerator system comprises a gas turbine (1) coupled to an alternator (4). The gas turbine is fed by an air or oxidizer supply line (2) and by a line (3) for feeding fuel that is preferably gaseous. The cogenerator alternator (4) delivers electricity via an electrical line (8). The hot combustion gases escape from the gas turbine (1) via an exhaust line (19). The exhaust line feeds a post-combustion chamber (10) having burners (11) themselves fed by a fuel feed line (3) branching from the line (3) feeding the gas turbine (1) with fuel. The hot exhaust gases from the post-combustion chamber (10) pass successively through a superheater chamber (13) and a preheater chamber (14) for exchanging heat with the mixture of hydrocarbons and steam flowing along a transport and heat exchange line (12) which passes in succession through the preheater and superheater chambers (14 and 13). The transport and heat exchange line (12) feeds a plurality of induction heater tubes (6) connected in parallel, only one of which is shown in FIG. 1. The induction heater tube comprises a cracking tube in which the mixture for cracking flows, and an induction coil (15) powered by the electrical line (8) coming from the alternator (4). The induction heater tube can be isolated in an enclosure (7). The mixture of hydrocarbons cracked in the tube (6) leaves the tube via a drawing-off line (16), and after being quenched one or more times (not shown in FIG. 1) it is subjected to fractioning, separation, and purification in a zone (17), in particular by being compressed and distilled. This zone serves firstly to isolate olefins such as ethylene and propylene via one or more drawing-off lines (18) and secondly light alkanes, e.g. in the $C_1$ to $C_4$ range, and preferably methane, via at least one other drawing-off line (19). This line has a cracked hydrocarbon recovery line (5) running therefrom to feed the gas turbine (1) and/or optionally the post-combustion chamber (10) with fuel via one of the feed lines (3).

The gaseous fuel feeding the gas turbine (1) e.g. via the feed line (3) is preferably at a minimum absolute pressure of 1.5 MPa to 2.0 MPa, e.g. at an absolute pressure lying in the range 1.5 MPa to 5 MPa, and preferably in the range 2 MPa to 4 MPa. The gaseous fuel feeding the post-combustion chamber (10), e.g. via the feed line (3), can be at a pressure which is lower than that of the fuel feeding the gas turbine (1), e.g. it can be at an absolute pressure lying in the range 0.2 MPa to 1.0 MPa, and preferably in the range 0.2 MPa to 0.6 MPa.

The invention claimed is:

1. In a method of steam cracking hydrocarbons, which method consists in heating a mixture of hydrocarbons and steam to a desired temperature that is high enough to crack the hydrocarbons and transform them into olefins, the improvement wherein the source of energy for heating the mixture is supplied essentially by cogeneration using combustion of a fuel to produce simultaneously both heat energy and mechanical work which is transformed into electricity by an alternator or an electricity generator, wherein the mixture is initially subjected to preheating using the heat energy supplied by the cogeneration, and is subsequently heated to the desired cracking temperature by means of electrical heating using the electricity supplied by the cogeneration, and wherein the congeneration produces the heat energy in the form of hot combustion gases, with a fraction of the oxygen thereof being used as oxidizer for performing post-combustion and increasing the heat energy used for preheating the mixture to be cracked.

2. A method according to claim 1, wherein the cogeneration uses a fuel selected from at least one of the cracked hydrocarbons.

3. A method according to claim 1, wherein the fuel is a gaseous hydrocarbon fuel.

4. A method according to claim 1, wherein the mechanical work is produced by a heat engine, a gas engine, or a gas turbine.

5. A method according to claim 1, wherein the cogeneration produces heat energy in the form of hot combustion gases at a temperature lying in the range 400° C. to 570° C.

6. A method according to claim 1, wherein the post-combustion provides exhaust gases having a temperature lying in the range 500° C. to 1100° C.

7. A method according to claim 6, wherein the heat of the exhaust gases is exchanged simultaneously with water or steam in one or more boilers to produce steam at low or medium pressure.

8. A method according to claim 1, wherein electrical heating is performed by induction heating.

9. A method according to claim 8, wherein induction heating is performed at high frequency (HF).

10. A method according to claim 1, wherein the electrical heating is performed by the Joule effect.

11. A method according to claim 10, wherein the Joule effect heating is performed using a resistance element tube in which the mixture for cracking flows.

12. A method according to claim 1, wherein ultrasound waves are applied to the mixture of hydrocarbons and steam during cracking.

13. A method according to claim 12, wherein an ultrasound wave generator is used that is powered by electricity supplied by the cogeneration.

14. A method according to claim 1, wherein the cogeneration uses a fuel selected from one or more alkanes in the range $C_1$ to $C_4$, wherein the cogeneration produces heat energy in the form of hot combustion gases at a temperature lying in the range of 470° C. to 550° C. and wherein the post-combustion provides exhaust gases having a temperature lying in the range of 500° C. to 800° C.

15. A method according to claim 1, wherein the method comprises feeding the fuel for the combustion of the cogeneration along a fuel feed line and wherein the post-combustion is performed in a post-combustion chamber, the method comprising performing the post-combustion by feeding fuel to the post-combustion chamber along the fuel feed line.

16. Hydrocarbon steam cracking apparatus comprising:
i) a cogenerator system comprising a gas turbine (1) connected to a line (2) for supplying it with air or oxidizer, to a fuel feed line (3) for feeding it with fuel, and to at least one exhaust line (9) for exhausting hot combustion gases from the gas turbine (1), the turbine itself being coupled to at least one alternator or electricity generator (4) connected to at least one electrical line (8);
ii) at least one preheating chamber (14) for preheating a mixture of hydrocarbons and steam, the chamber being connected to at least one of the lines (9) for evacuating hot combustion gases and having at least one line (12) passing therethrough for transporting said mixture and enabling heat to be exchanged therewith;
iii) at least one electrical heater apparatus for heating at least one cracking tube (6) connected to at least one of the transport and heat exchange lines (12) leaving the chamber (14), and at least one drawing-off line (16) for drawing off cracked hydrocarbons, said electrical heater apparatus being connected to at least one of the electrical lines (8);
iv) at least one zone (17) for separating and purifying the cracked hydrocarbons, said zone being connected to at least one of the drawing-off lines (16), and
v) at least one post-combustion chamber (10) placed on at least one of the lines (9) for evacuating combustion gases from the gas turbine (1) and feed means for feeding fuel to the at least one post-combustion chamber.

17. Apparatus according to claim 16, wherein the electrical heater apparatus comprises at least one induction heater tube.

18. Apparatus according to claim 16, wherein the electrical heater apparatus is apparatus for Joule effect heating.

19. Apparatus according to claim 18, wherein the Joule effect heater apparatus comprises one or more resistance element tubes in which the mixture for cracking flows.

20. Apparatus according to claim 16, wherein the zone (17) for separating and purifying the cracked hydrocarbons comprises at least one drawing-off line (19) for drawing off at least one cracked hydrocarbon, and in that said drawing-off line (19) has at least one recovery line (5) running therefrom for recovering at least one cracked hydrocarbon and connected to at least one of the lines (3) for feeding fuel to the gas turbine (1).

21. Apparatus according to claim 16, wherein the cracked hydrocarbon separation and purification zone (17) comprises at least one drawing-off line (19) for drawing off at least one cracked hydrocarbon, and in that said at least one drawing-off line (19) has at least one recovery line (5) running therefrom for recovering at least one cracked hydrocarbon and connected to the line for feeding at least one of the post-combustion chambers (10).

22. Apparatus according to claim 16, wherein the feed means for feeding fuel to the at least one post combustion chamber comprises the fuel feed line (3).

* * * * *